US012623661B2

(12) United States Patent
Ikezawa

(10) Patent No.: US 12,623,661 B2
(45) Date of Patent: May 12, 2026

(54) DRIVING SUPPORT APPARATUS

(71) Applicant: TOYOTA JIDOSHA KABUSHIKI KAISHA, Toyota (JP)

(72) Inventor: Yuta Ikezawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 263 days.

(21) Appl. No.: 18/472,813

(22) Filed: Sep. 22, 2023

(65) Prior Publication Data

US 2024/0157943 A1     May 16, 2024

(30) Foreign Application Priority Data

Nov. 16, 2022   (JP) ................................. 2022-183524

(51) Int. Cl.
*B60W 30/18*        (2012.01)
*B60W 50/14*        (2020.01)
*G06V 20/56*        (2022.01)

(52) U.S. Cl.
CPC ...... *B60W 30/18159* (2020.02); *B60W 50/14* (2013.01); *G06V 20/588* (2022.01); *B60W 2050/146* (2013.01); *B60W 2420/403* (2013.01); *B60W 2552/05* (2020.02); *B60W 2552/53* (2020.02); *B60W 2720/106* (2013.01)

(58) Field of Classification Search
CPC ........... B60W 30/18159; B60W 50/14; B60W 2050/146; B60W 2420/403; B60W 2552/05; B60W 2552/53; B60W 2720/106; G06V 20/588
See application file for complete search history.

(56) References Cited

U.S. PATENT DOCUMENTS

| | | | |
|---|---|---|---|
| 6,269,304 B1 * | 7/2001 | Kaji ................... | G01C 21/3658 |
| | | | 701/428 |
| 8,355,851 B2 | 1/2013 | Inoue et al. | |
| 8,370,040 B2 | 2/2013 | Inoue et al. | |
| 8,417,430 B2 | 4/2013 | Saek | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |

(Continued)

FOREIGN PATENT DOCUMENTS

JP          2021-086482 A      6/2021

*Primary Examiner* — Hunter B Lonsberry
(74) *Attorney, Agent, or Firm* — Sughrue Mion, PLLC

(57)            ABSTRACT

A driving support apparatus comprises a camera, and a controller for executing a support control for supporting the vehicle turning at an intersection. The controller stores a prohibited direction in which a road arrow marked on a lane prohibits the vehicle from turning. The controller executes the support control when the controller detects the intersection and a turn direction is not the prohibited direction. The controller deletes the prohibited direction when the vehicle travels on a lane that is not a one-lane on one side and a travel distance after the vehicle passes through the road arrow is equal to or longer than a first delete distance, and deletes the prohibited direction when the vehicle travels on the one-lane on one side and the travel distance is equal to or longer than a second delete distance shorter than the first delete distance.

3 Claims, 6 Drawing Sheets

(56)     References Cited

U.S. PATENT DOCUMENTS

| | | | |
|---|---|---|---|
| 10,486,698 B2 | 11/2019 | Masui et al. | |
| 2017/0103272 A1* | 4/2017 | Satomura | B60Q 9/00 |
| 2019/0272751 A1* | 9/2019 | Adachi | G05D 1/0223 |
| 2019/0295419 A1 | 9/2019 | Tosa et al. | |
| 2020/0001875 A1* | 1/2020 | Kato | G01C 21/3602 |
| 2021/0163035 A1 | 6/2021 | Tezuka et al. | |
| 2021/0342603 A1* | 11/2021 | Hori | G08G 1/16 |

* cited by examiner

MODIFICATION EXAMPLE

DIRECTION DELETE ～600

405
Xpass=1? —No

Yes —410
ACQUIRE IMAGE DATA

415
D←D+Dp

420
IS VEHICLE TRAVELING ON ONE-LANE ON ONE SIDE? —Yes

No 425
D≥D1th?

No

Yes —605
DELETE ALLOWED DIRECTION AND PROHIBITED DIRECTION

440
D≥D2th? D2th<D1th —No

Yes 610
DELETE PROHIBITED DIRECTION

615
D≥D3th? D3th>D1th —No

Yes 620
DELETE ALLOWED DIRECTION

435
Xpass←0

RETURN ～695

DRIVING SUPPORT APPARATUS

TECHNICAL FIELD

The present disclosure relates to a driving support apparatus configured to execute a support control for supporting a right or left turn when a vehicle performs the right or left turn at an intersection.

BACKGROUND

Conventionally, a driving support apparatus configured to execute a support control for supporting a right or left turn has been known. Such a driving support apparatus specifies a prohibited direction of the right or left turn based on a road arrow marked on a lane on which the vehicle travels, and executes the support control when a turn direction in which the vehicle will turn right or left is not the prohibited direction. The road arrow indicates an allowed direction in which the vehicle is allowed to travel.

The road arrow is marked in front of an intersection. Therefore, the driving support apparatus needs to store the specified prohibited direction. For example, the driving support apparatus described in Patent Document 1 (hereinafter, referred to as a "conventional apparatus") stores information on the road arrow, and deletes the information on the road arrow when a travel distance which the vehicle has traveled since the road arrow was last detected becomes equal to or longer than a threshold distance.

Patent Document 1: Japanese Patent Application Laid-Open No. 2021-86482

SUMMARY

There are two intersections in a row. There is the road arrow that is applied to a front intersection and not to a back intersection. In particular, it is difficult to detect the intersection in a one-lane on one side, because, in the one-lane on one side, there are many "intersections where no traffic lights are installed" and "intersections where a width of an intersecting lane is narrow". The intersecting lane is a lane intersecting the lane on which the vehicle travels. In a case where the front intersection is not detected and a distance from the road arrow to the back intersection is shorter than the threshold distance, the conventional apparatus does not delete the information on the road arrow applied only to the front intersection. Therefore, the conventional apparatus erroneously applies this road arrow to the back intersection. As a result, there is a possibility that the conventional apparatus cannot appropriately execute the support control when the vehicle turns right or left at the back intersection.

The present disclosure has been made to address the above-described problem. That is, an object of the present disclosure is to provide a driving support apparatus capable of reducing a possibility that the support control cannot be appropriately executed when the vehicle travels on the one-lane on one side.

A driving support apparatus (hereinafter, referred to as the "present disclosure apparatus") according to the present disclosure comprises:

a camera (22) configured to acquire image data by capturing a scene in front of a vehicle; and a controller (20) configured to execute a support control for supporting the vehicle turning right or left at an intersection when a support condition is satisfied.

The controller is further configured to:

store, to a storage area (28a), a prohibited direction in which a road arrow marked on a lane on which the vehicle is traveling prohibits the vehicle from turning (step 330), when the controller detects the road arrow based on the image data (step 315 "Yes");

determine that the support condition is satisfied when both a first condition that the controller detects the intersection in front of the vehicle and a second condition that a turn direction in which the vehicle will turn right or left is not the prohibited direction are satisfied (step 505 "Yes", step 520 "No");

delete the prohibited direction from the storage area (step 430) when the vehicle travels on a lane that is not a one-lane on one side (step 420 "No") and a travel distance which the vehicle has traveled since the vehicle passes through the road arrow is equal to or longer than a first delete distance (step 425 "Yes"); and delete the prohibited direction from the storage area (step 430) when the vehicle travels on the one-lane on one side (step 420 "Yes") and the travel distance is equal to or longer than a second delete distance shorter than the first delete distance (step 440 "Yes").

In the one-lane on one side, the possibility that the intersection is not detected is high. Therefore, the road arrow marked in front of the intersection which is not detected is likely to be erroneously applied to the next intersection. In a case where the vehicle travels on the one-lane on one side, the present disclosure apparatus deletes the prohibited direction from the storage area when the traveling distance after the vehicle passes the road arrow is equal to or longer than the "second delete distance shorter than the first delete distance". Accordingly, the present disclosure apparatus can reduce the possibility that the road arrow is erroneously applied to the intersection when the vehicle travels on the one-lane on one side. Therefore, the present disclosure apparatus can reduce the possibility that the support control cannot be appropriately executed.

DETAILED DESCRIPTION

Figure 1:
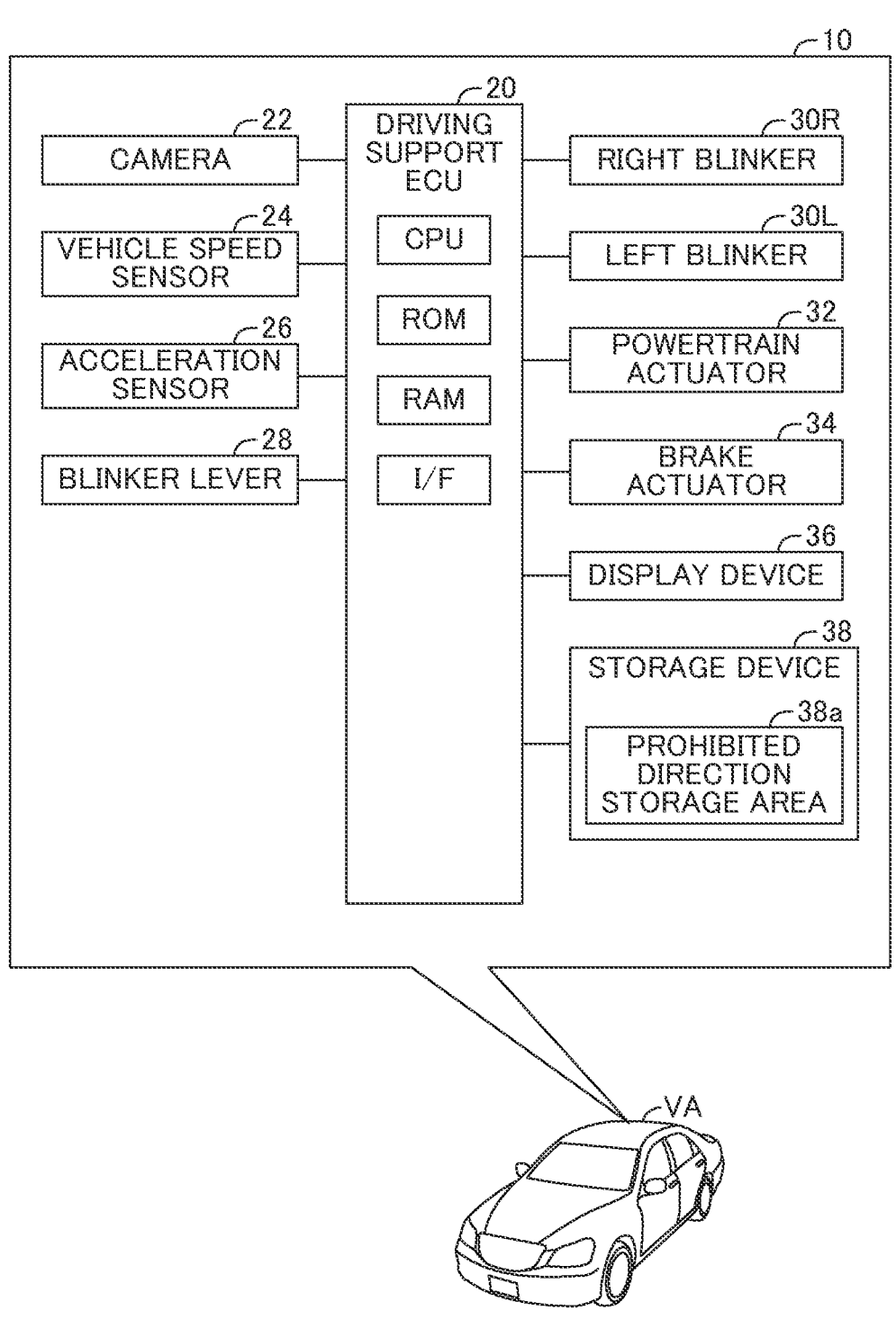
FIG. 1 is a schematic configuration diagram of a driving support apparatus according to an embodiment of the present disclosure.

As illustrated in FIG. 1, a driving support apparatus 10 according to the embodiment of the present disclosure is applied to a vehicle VA. Hereinafter, the driving support apparatus 10 is referred to as a "present apparatus 10". The present apparatus 10 includes components illustrated in FIG. 1.

A driving support ECU20 is an ECU that executes a support control described. The support control is a kind of automated driving. Hereinafter, the driving support ECU20 is hereinafter referred to as an "ECU20".

In the present specification, the "ECU" is an electronic control unit including a microcomputer as a main part. The ECU may be referred to as a control unit, a controller, or a computer. The microcomputer includes a CPU (a processor), a ROM, a RAM, an interface, and the like. A function of the ECU20 may be realized by a plurality of ECUs.

The camera 22 acquires image data by capturing a scene in front of the vehicle VA, and acquires road arrow information and traffic light information based on the image data. The camera 22 transmits the road arrow information and the traffic light information to the ECU20.

The road arrow information is information related to a road arrow RA marked on a lane on which the vehicle VA travels. The road arrow information includes an allowed direction in which the road arrow RA allows the vehicle VA to travel and a distance Dra to the road arrow RA. The traffic light information includes a distance Dtr to a traffic light TR installed on a road.

The vehicle speed sensor 24 detects a vehicle speed Vs representing the speed of the vehicle VA. The acceleration sensor 26 detects a longitudinal acceleration G of the vehicle VA. The ECU20 acquires these detection values.

The blinker lever 28 is disposed in the vicinity of a steering wheel (not shown) of the vehicle VA. When a driver operates the blinker lever 28 downward, a right blinker 30R is activated (blinks). When the driver operates the blinker lever 28 upward, a left blinker 30L is activated (blinks). It should be noted that a relation between an operating direction of the blinker lever 28 and whether the right blinker 30R or the left blinker 30L is activated is not limited to this.

The right blinker 30R is disposed on the right side of the vehicle VA. The left blinker 30L is disposed on the left side of the vehicle VA. A powertrain actuator 32 changes a driving force generated by a driving device (for example, an internal combustion engine and/or an electric motor) of the vehicle VA. A brake actuator 34 controls a braking force applied to the vehicle VA. A display device 36 is disposed in a cabin of the vehicle VA. The display device 36 displays a support screen representing the distance to an intersection. A storage device 38 has a prohibited direction storage area 38a in which the ECU20 can read and write data. The prohibited direction storage area 38a stores a prohibited direction in which the road arrow RA prohibits the vehicle VA from traveling between the right direction and the left direction. (Operation)

When the vehicle VA turns right or left at the intersection, the ECU20 executes a support control for supporting for the vehicle VA to turn right or left at the intersection. As an example, the ECU20 executes a deceleration control for decelerating the vehicle speed Vs to a predetermined support vehicle speed Vrl as the support control. Note that the ECU20 may execute a display control for causing the display device 36 to display the support screen as the support control, or may execute both the deceleration control and the display control as the support control.

More specifically, when both of the following conditions 1 and 2 are satisfied, the ECU20 determines that a predetermined support condition is satisfied, and executes the support control.

Condition 1: The ECU20 has detected the intersection.

As an example, the ECU20 specifies the distance Dtr based on the traffic light information, and determines that the intersection has been detected when the distance Dtr becomes equal to or shorter than a predetermined starting distance Dst.

Condition 2: A turn direction in which VA will (is going to) turn right or left is not the prohibition direction.

The ECU20 specifies the turn direction based on the operating direction of the blinker lever 28. That is, the ECU20 specifies that the turn direction is the right direction when the driver operates the blinker lever 28 downward, and specifies that the turn direction is the left direction when the driver operates the blinker lever 28 upward.

Further, the ECU20 specifies the allowed direction based on the road arrow information, and specifies a direction that is not the allowed direction between the right direction and the left direction as the prohibited direction. Then, the ECU20 stores the prohibited direction in the prohibited direction storage area 38a.

When the turn direction is the prohibited direction, the vehicle VA is unlikely to turn right or left at the intersection. Therefore, the support condition includes the condition 2. For example, in a case where the prohibited direction is the left direction, the turn direction is the prohibition direction when the vehicle VA overtakes a "preceding vehicle that stops in order to turn right" from the left direction.

The ECU20 needs to delete the prohibited direction stored in the prohibited direction storage area 38a in order to prevent the prohibited direction specified by the road arrow RA from being applied to an intersection where the prohibited direction should not be applied. The ECU20 deletes the prohibited direction when a travel distance D which the vehicle VA has traveled since the vehicle VA passes through the road arrow RA becomes equal to or longer than a predetermined delete distance Dth. In particular, the ECU20 of the present embodiment is characterized in that a second delete distance D2th of when the vehicle VA is traveling on a one-lane on one side is shorter than a first delete distance D1th of when the vehicle VA is traveling on a lane that is not the one-lane on one side.

Figure 2:
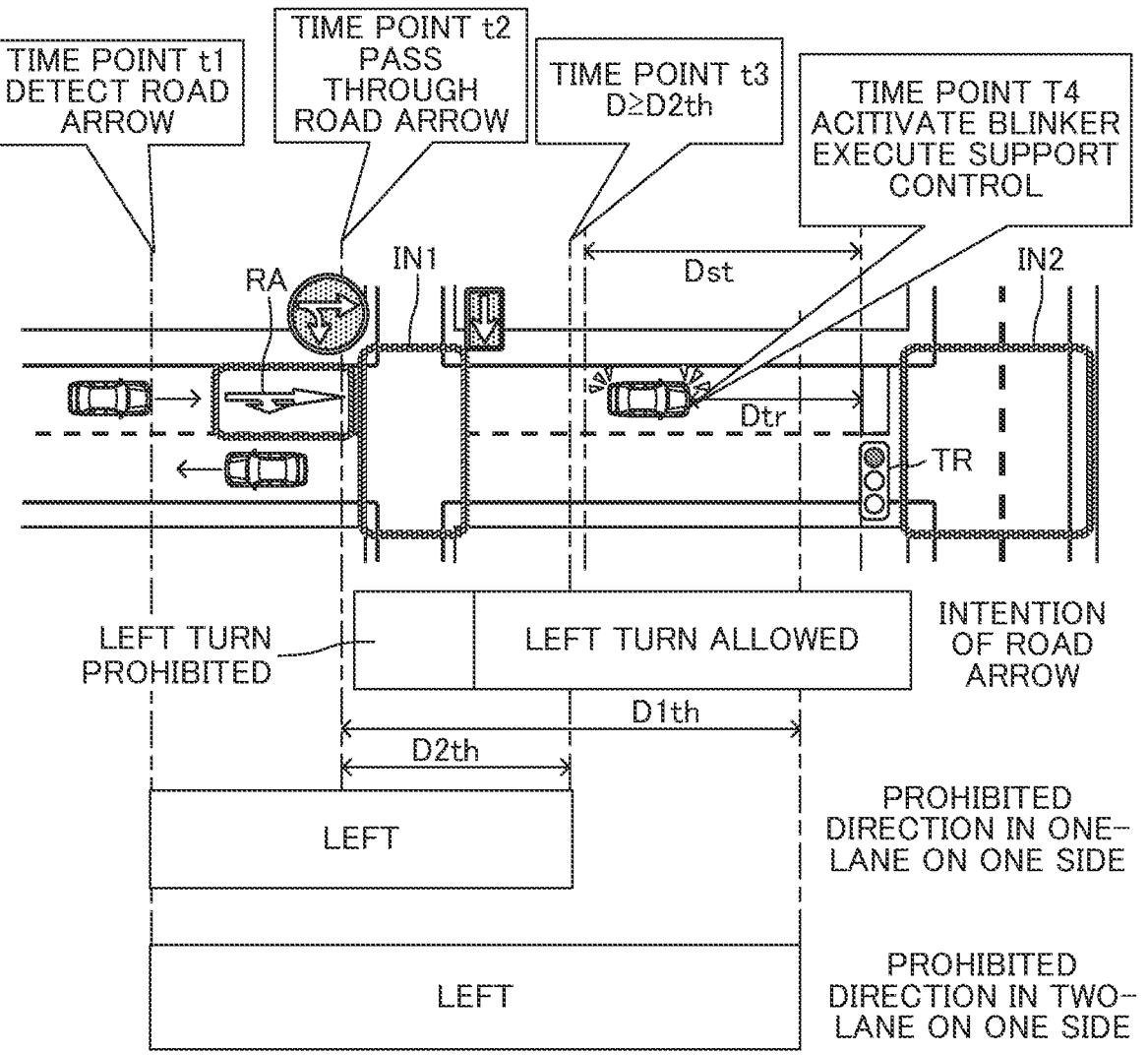
FIG. 2 is a diagram for explaining an operation of the driving support apparatus.

As shown in FIG. 2, there are two intersections IN1 and IN2 on a road of the one-lane on one side. The allowed direction and the prohibited direction of the road arrow RA are applied only to the intersection IN1. The road arrow RA prohibits the left turn at the intersection IN1, but does not prohibit the left turn at the intersection IN2.

A traffic light TR is not installed at the intersection IN1, and a traffic light TR is installed at the intersection IN2. Therefore, the ECU20 can detect the intersection IN2 based on the traffic light information, but cannot detect the intersection IN1 based on the traffic light information. The "intersection at which the traffic light TR is not installed" (i.e., an intersection which the ECU20 cannot detect) is likely to be present on the one-lane on one side. As described above, in a case where the vehicle VA is traveling on the one-lane, the ECU20 deletes the prohibited direction when the traveling distance D becomes equal to or longer than the "second delete distance D2th shorter than the first delete distance D1th". Thus, according to the present embodiment, it is possible to reduce a possibility that the allowed direction and the prohibited direction of the road arrow RA are also applied to the intersection IN2, and it is possible to reduce a possibility that the support control is not executed when the vehicle VA turns left at the intersection IN2.

Operation Example

At a time point t1 shown in FIG. 2, the ECU20 detects the road arrow RA and stores the prohibited direction (left) in the prohibited direction storage area 38a. At a time point t2, the ECU20 determines that the vehicle VA passes the road arrow RA and starts counting the travel distance D.

At a time point t3, the ECU20 deletes the prohibited direction (left) from the prohibited direction storage area 38*a* because the travel distance D becomes equal to or longer than the second erasure distance D2*th*.

It should be noted that the ECU20 determines whether or not a one-lane condition is satisfied every time a predetermined period elapses. Specifically, the ECU20 determines that the one-lane condition is satisfied when both of the following conditions 3 and 4 are satisfied.

Condition 3: A guard rail, a curb, a road edge or the like is detected on the left side of the vehicle VA.

Condition 4: An adjacent lane is present on the right side of a traveling lane on which the vehicle VA is traveling, and an adjacent vehicle which is traveling on the adjacent lane is an oncoming vehicle which is traveling toward the vehicle VA.

At time point t4, the distance Dtr is equal to or shorter than the starting distance Dst, and the blinker lever 28 is operated upward. In this case, since the distance Dtr is equal to or shorter than the starting distance Dst, the above condition 1 is satisfied. Since the prohibited direction is not stored in the prohibited direction storage area 38*a*, the turn direction (left direction) is not the prohibited direction. Therefore, the above condition 2 is satisfied. Accordingly, the ECU20 determines that the support condition is satisfied at the time point t4, and executes the support control.

If the ECU20 determines that the vehicle VA is traveling on a lane (for example, either lane of two lanes on one side) that is not the one-lane on one side, the ECU20 deletes the prohibited direction when the traveling distance D becomes equal to or larger than the "first delete distance D1*th* longer than the second delete distance D2*th*".

(Specific Operation)

Figure 3:
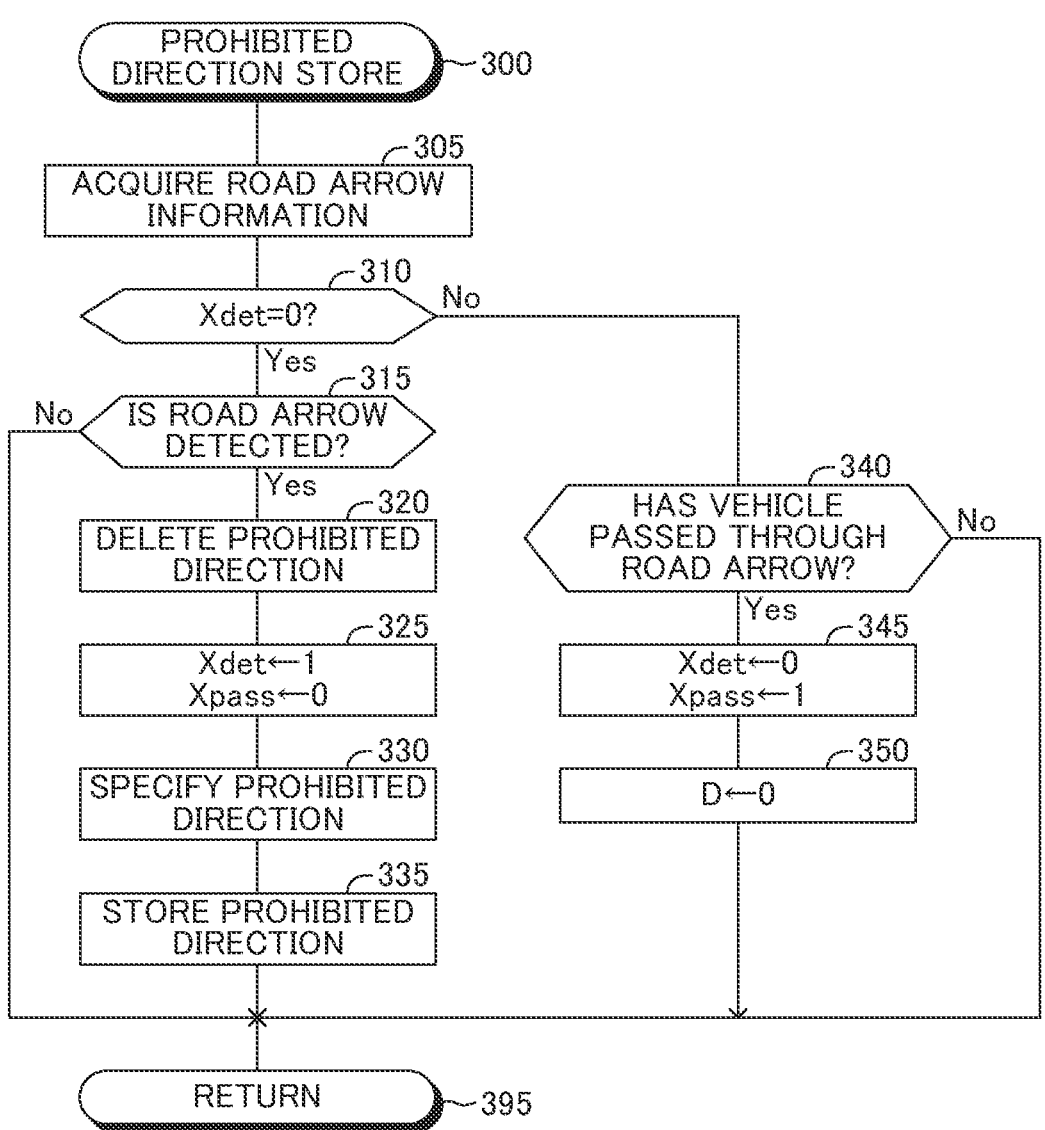
FIG. 3 is a flowchart of a routine executed by a CPU of the driving support apparatus.

The CPU of the ECU20 is executed every time a predetermined period elapses in a routine illustrated by the flow chart in FIG. 3.

<Prohibited Direction Store Routine>

When an appropriate time point has arrived, the CPU starts a process from step 300 of FIG. 3 and executes step 305 and step 310.

Step 305: The CPU acquires the road arrow information.

Step 310: The CPU determines whether or not a detection flag Xdet is "0". The CPU sets the detection flag Xdet to "1" from a time point at which the road arrow RA is detected to a time point at which the vehicle VA passes through the road arrow VA. The CPU sets the detection flag Xdet to "0" in the initialization routine. The CPU executes the initialization routine when an ignition key switch is changed from an off position to an on position.

When the CPU determines that the detection flag Xdet is "0" (step 310 "Yes"), the CPU determines whether or not the road arrow RA is detected based on the road arrow information in step 315.

When the CPU determines that the road arrow RA is detected (step 315 "Yes"), the CPU executes steps 320 to 335.

Step 320: The CPU deletes the prohibited direction stored in the prohibited direction storage area 38*a*.

Step 325: The CPU sets the detection flag Xdet to "1" and sets a pass flag Xpass to "0". The CPU sets the passing flag Xpass to "1" when the vehicle VA passes the road arrow RA, and sets the passing flag Xpass to "0" when the prohibited direction of the road arrow RA is deleted.

Step 330: The CPU specifies the prohibited direction based on the road arrow information.

Step 335: The CPU stores the prohibited direction in the prohibited direction storage area 38*a*.

After that, the process proceeds to step 395, and the CPU terminates the present routine tentatively.

When the CPU determines that the detection flag Xdet is "1" in step 310 (step 310 "No"), the CPU determines whether or not the vehicle VA has passed through the road arrow RA based on the road arrow information in step 340.

When the CPU determines that the vehicle VA has passed the road arrow RA (step 340 "Yes"), the CPU executes step 345 and step 350.

Step 345: The CPU sets the detection flag Xdet to "0" and sets the pass flag Xpass to "1".

Step 350: The CPU sets the travel distance D to "0".

After that, the process proceeds to step 395, and the CPU terminates the present routine tentatively.

When the CPU determines that the road arrow RA is not detected (step 315 "No"), or when the CPU determines that the vehicle VA has not passed the road arrow RA (step 340 "No"), the process proceeds to step 395, and the CPU terminates the present routine tentatively.

<Prohibited Direction Delete Routine>

Figure 4:
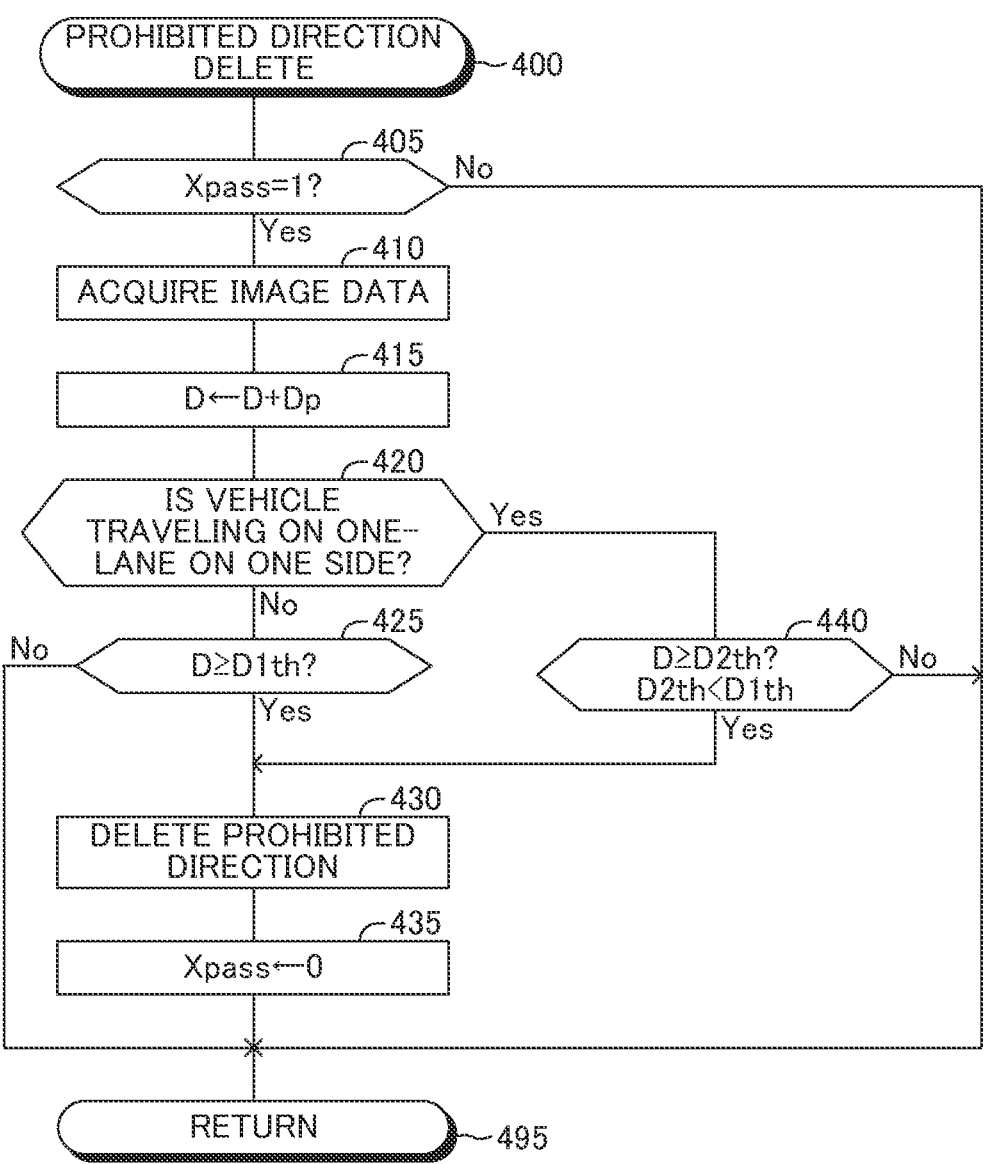
FIG. 4 is a flowchart of a routine executed by the CPU of the driving support apparatus.

When an appropriate time has arrived, the CPU starts a process from step 400 of FIG. 4 and the process proceeds to step 405. In step 405, the CPU determines whether or not the pass flag Xpass is "1".

When the CPU determines that the pass flag Xpass is "1" (step 405 "Yes"), the CPU executes steps 410 to 420.

Step 410: The CPU acquires the image data from the camera 22.

Step 415: The CPU adds a current travel distance Dp to the travel distance. The current travel distance Dp is a distance traveled by the vehicle VA from a time point at which the present routine was last executed to a time point at which the present routine is executed this time. The CPU specifies the current travel distance Dp based on the detected value from the vehicle speed sensor 24.

Step 420: The CPU determines whether or not the vehicle VA is traveling on the one-lane on one side based on the image data.

When the CPU determines that the vehicle VA is not traveling on the one-lane on one side (step 420 "No"), the CPU determines whether or not the travel distance D is equal to or longer than the first delete distance D1*th* in step 425.

When the CPU determines that the travel distance D is equal to or longer than the first delete distance D1*th* (step 425 "Yes"), the CPU executes steps 430 and 435. After that, the process proceeds to step 495, and the CPU terminates the present routine tentatively.

Step 430: The CPU deletes the prohibited direction stored in the prohibited direction storage area 38*a*.

Step 435: The CPU sets the pass flag Xpass to "0".

When the CPU determines that the vehicle VA is traveling on the one-lane on one side (step 420 "Yes"), the CPU determines whether or not the travel distance D is equal to or longer than the second delete distance D2*th* in step 440. When the CPU determines that the travel distance D is equal to or longer than the second delete distance D2*th* (step 440 "Yes"), the process proceeds to step 430.

When the CPU determines that the pass flag Xpass is "0" (step 405 "No"), when the CPU determines that the travel distance D is shorter than the first delete distance D1*th* (step 425 "No"), or when the CPU determines that the travel distance D is shorter than the second delete distance D2*th* (step 440 "No"), the process proceeds to step 495, and the CPU terminates the present routine tentatively.

<Support Control Routine>

Figure 5:
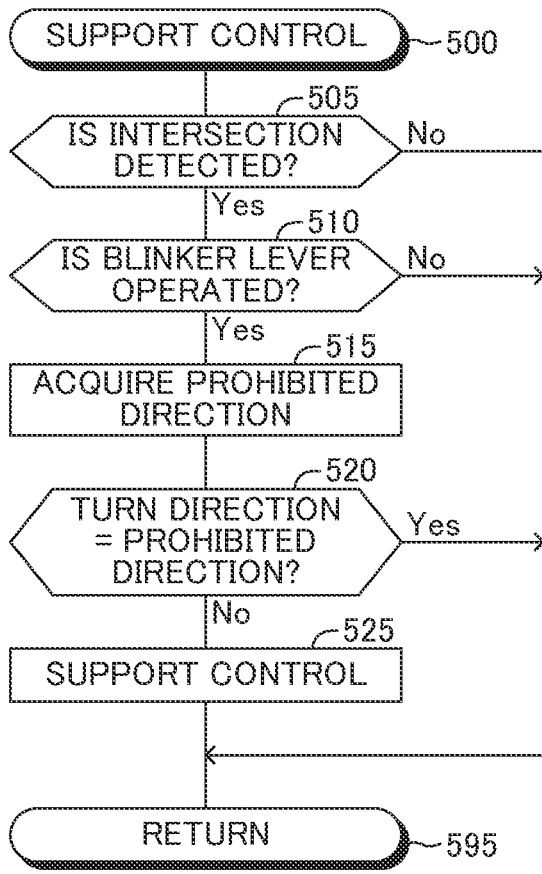
FIG. 5 is a flowchart of a routine executed by the CPU of the driving support apparatus.

When an appropriate time point has arrived, the CPU starts a process from step 500 of FIG. 5, and the process proceeds to step 505. In step 505, the CPU determines whether or not the intersection is detected. Specifically, the CPU determines whether or not the distance Dtr is equal to or shorter than the starting distance Dst.

When the CPU determines that the intersection is detected (step 505 "Yes"), the CPU determines whether or not the blinker lever 28 is operated in step 510.

When the CPU determines that the blinker lever 28 is operated (step 510 "Yes"), the CPU executes steps 515 and 520.

Step 515: The CPU acquires the prohibited direction stored in the prohibited direction storage area 28*a*.

Step 520: The CPU determines whether or not the turn direction specified based on a direction to which the blinker lever 28 is operated coincides with the prohibited direction. The CPU determines that the turn direction does not coincide with the prohibited direction when the prohibited direction is not stored in the prohibited direction storage area 28*a*.

When the CPU determines that the turn direction does not coincide with the prohibited direction (step 520 "No"), the CPU executes the support control in step 525. After that the process proceeds to step 595, and the CPU terminates the present routine tentatively.

In the support control, the CPU acquires a target acceleration Gtgt (Gtgt<0) for coinciding the vehicle speed Vs with the support speed Vrl. Then, the CPU controls the powertrain actuator 32 and the brake actuator 34 such that the acceleration G of the vehicle VA coincides with the target acceleration Gtgt.

When the CPU determines that the intersection is not detected (step 505 "No"), when the CPU determines that the blinker lever 28 is not operated (step 510 "No"), or when the CPU determines that the turn direction coincides with the prohibited direction (step 520 "Yes"), the process proceeds to step 595, and the CPU terminates the present routine tentatively.

As described above, in a case where the vehicle VA is traveling on the one-lane on one side, the ECU20 deletes the prohibited direction when the travel distance D is equal to or longer than the "second delete distance D2*th* shorter than the first delete distance D1*th*". In the one-lane on one side, there is a high possibility that ECU20 cannot detect the intersection due to the fact that there are many intersections where no traffic light TR is installed in the one-lane on one side. When the vehicle VA travels on the one-lane on one side, the ECU20 can reduce the possibility of erroneously applying the road arrow RA which should apply to the undetected intersection to the detected intersection.

(Modification)

The ECU20 of the present modification stores the allowed direction and the prohibited direction specified based on the road arrow RA in the prohibited direction storage area 28*a* when the road arrow RA is detected. In a case where the support condition is satisfied, the ECU20 suppresses the support control when the allowed direction is not stored in the prohibition direction storage area 28*a* as compared to when the turn direction coincides with the allowed direction.

In a case where the vehicle VA is traveling on the one-lane on one side, The ECU20 deletes the allowed direction from the prohibited direction storage area 28*a* when the travel distance D is equal to or longer than a "third delete distance D3*th* longer than the second delete distance D2*th*". For example, the third delete distance D3*th* is set to the same value as the first delete distance D1*th*. It should be noted that, in a case where the vehicle VA is traveling on the lane that is not the one-lane on one side, the ECU20 deletes the allowed direction when the travel distance D is equal to or longer than the first delete distance D1*th*

When the ECU20 detects a new road arrow RA after the vehicle VA passes the road arrow RA, the ECU20 deletes the allowed direction and the prohibited direction stored in the prohibited direction storage area 28*a*, and stores the allowed direction and the prohibited direction specified based on the new road arrow RA in the prohibited direction storage area 28*a*.

In the above-described embodiment, if the ECU20 erroneously applies the prohibited direction of the road arrow RA which should be applied to the front intersection IN1 to the back intersection IN2, the ECU20 may not execute the support control. Therefore, the ECU20 shortens the delete distance for deleting the prohibited direction when the vehicle VA is traveling on the one-lane on one side. However, even if the ECU20 erroneously applies the allowed direction of the road arrow RA which should be applied to the front intersection IN1 to the back intersection IN2, this erroneous application is not a problem as long as the ECU20 detects the new road arrow RA. It is considered that the vehicle VA is highly likely to turn right or left in when the travel distance D is equal to or longer than the second delete distance D2*th*. Therefore, in the present modification, as described above, the delete distance for deleting the allowed direction is set longer than the second delete distance D2*th*.

The fact that the allowed direction is not stored means that the vehicle VA travels at least the first delete distance D1*th* (or the third delete distance D3*th*) from a time point at which the vehicle passes through the road arrow RA without detecting a new road arrow RA. It is considered that the possibility that the vehicle VA turns left or right when the allowed direction is not stored is lower than when the allowed direction is stored and the turn direction coincides with the allowed direction. Therefore, when the support condition is satisfied and the allowed direction is not stored, the ECU20 executes the suppression support control that is suppressed more than the normal support control.

Figure 6:
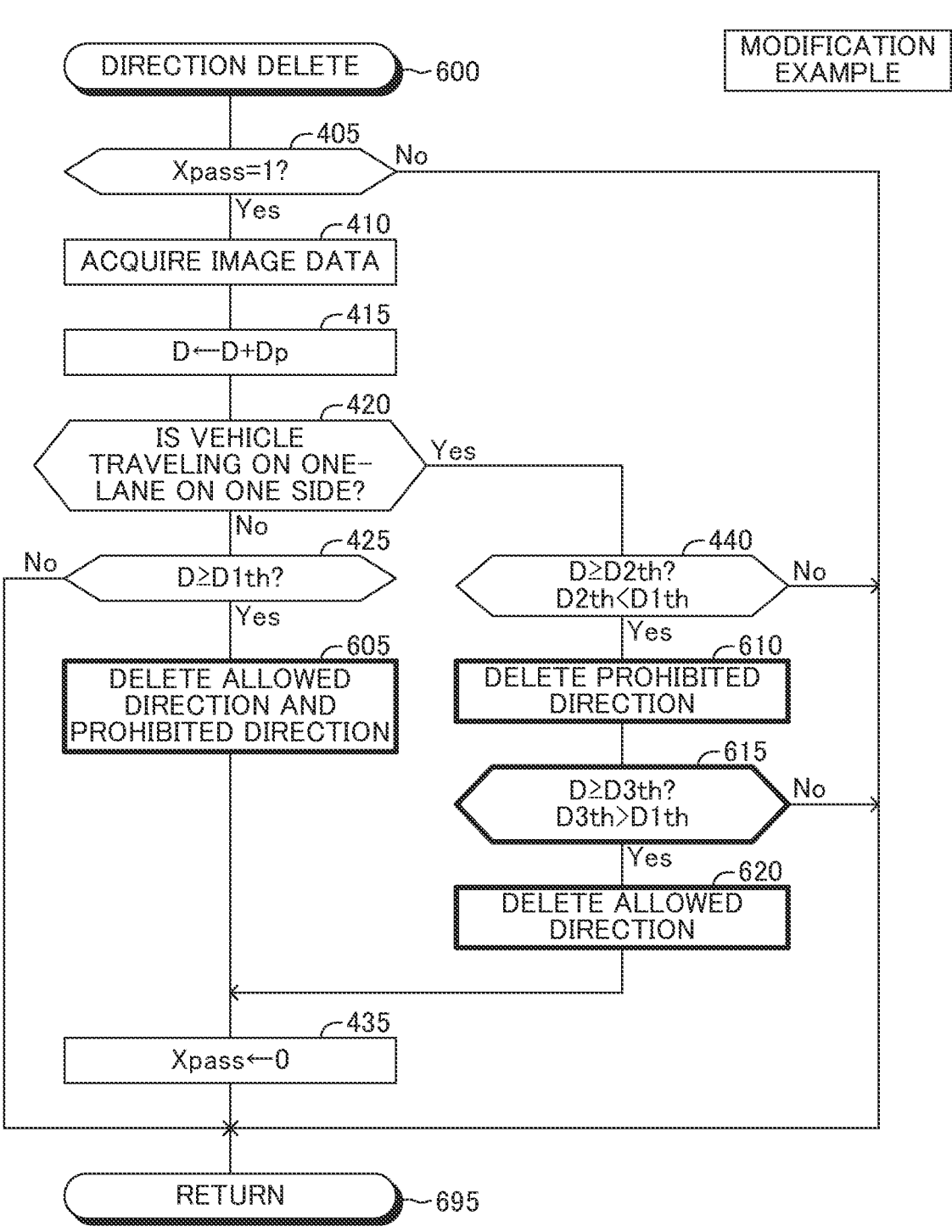
FIG. 6 is a flowchart of a routine executed by a CPU of a driving support apparatus according to a modification example of the embodiment of the present disclosure.

The CPU of the ECU20 of the present modification executes a direction delete routine shown in FIG. 6 instead of the prohibited direction delete routine shown in FIG. 4. In FIG. 6, the same reference numerals are given to the same processes as those shown in FIG. 4, and descriptions of the processes are omitted.

When an appropriate time point has arrived, the CPU starts a process from step 600 of FIG. 6. When the CPU makes a "Yes" determination in step 425 shown in FIG. 6, the process proceeds to step 605. In step 605, the CPU deletes the allowed direction and the prohibited direction stored in the prohibited direction storage area 38*a*, and the process proceeds to step 435 shown in FIG. 6.

When the CPU makes a "Yes" determination in step 440 shown in FIG. 6, the CPU executes step 610 and step 615.

Step 610: The CPU deletes the prohibited direction stored in the prohibited direction storage area 38*a*.

Step 615: The CPU determines whether or not the travel distance D is equal to or longer than the "third delete distance D3*th* longer than the second delete distance D2*th*".

When the CPU determines that the travel distance D is equal to or longer than the third delete distance D3*th* (step 615 "Yes"), the CPU deletes the allowed direction stored in the prohibited direction storage area 38*a* in step 620. After that, the process proceeds to step 435 shown in FIG. 6. When the CPU determines that the travel distance D is shorter than the third delete distance D3*th* (step 615 "No"), the process proceeds to step 695, and the CPU terminates the present routine tentatively.

The suppressed support control (suppression support control) will be described.

In a case where the CPU executes the deceleration control as the support control, the CPU controls the powertrain actuator 32 and the brake actuator 34 such that the acceleration G coincides with a predetermined acceleration Gpd when the target acceleration Gtgt is smaller than the predetermined acceleration Gpd (Gpd<0). In the suppressed support control, the CPU controls the powertrain actuator 32 and the brake actuator 34 such that the acceleration G coincides with the suppression acceleration Gyok when the target acceleration Gtgt is smaller than "a suppression acceleration Gyok (Gyok<0 which is greater than the predetermined acceleration Gpd").

In a case where the CPU executes the display control as the support control, the CPU causes the display device 36 to display the support screen when the distance Dtr becomes equal to or shorter than a display distance Ddp. In the suppressed support control, when the distance Dtr becomes equal to or shorter than a "suppression display distance Dyok shorter than the display distance Ddp", the CPU causes the display device 36 to display the support screen.

In the above embodiment, the ECU20 detects the intersection by detecting the traffic light TR, but the present disclosure is not limited thereto. For example, the ECU20 may detect, as the intersection, an area where an intersection line distance between two intersection lines is equal to or longer than a threshold distance. In particular, the ECU20 recognizes white lines based on the image data. Then, the ECU20 specifies a division line that divides a traveling lane on which the vehicle VA is traveling, and specifies an intersection line that intersects the division line. As described above, when the ECU20 detects the intersection based on the white line, the ECU20 cannot detect the intersection unless the intersection line can be specified. Since there are many intersections where a width of an intersection lane intersecting the traveling lane is short in the one-lane on one side, there is a high possibility that the ECU20 cannot detect the intersection because the intersection line cannot be specified.

The support apparatus 10 may be applied to vehicles such as an engine vehicle, a HEV (Hybrid Electric Vehicle), a PHEV (Plug-in Hybrid Electric Vehicle), a FCEV (Fuel Cell Electric Vehicle), and a BEV (Battery Electric Vehicle).

What is claimed is:

1. A driving support apparatus comprising:
a camera configured to acquire image data by capturing a scene in front of a vehicle;
a blinker lever configured to specify an operating direction; and
a controller configured to:
store, to a storage area, a prohibited direction in which a road arrow marked on a lane on which the vehicle is traveling prohibits the vehicle from turning, when the controller detects the road arrow based on the image data;
specify a turn direction based on the operating direction of the blinker lever;
determine that a support condition is satisfied when both a first condition that the controller detects an intersection in front of the vehicle and a second condition that the turn direction in which the vehicle will turn right or left is not the prohibited direction are satisfied;
delete the prohibited direction from the storage area when the vehicle travels on a lane that is not a one-lane on one side and a travel distance which the vehicle has traveled since the vehicle passes through the road arrow is equal to or longer than a first delete distance;

delete the prohibited direction from the storage area when the vehicle travels on the one-lane on one side and the travel distance is equal to or longer than a second delete distance,
wherein the second delete distance is shorter than the first delete distance, and
wherein the lane that is one-lane on one side is a lane in which, on a lateral side of the vehicle, there is any one of a guardrail, a curb, or a road edge, and on another lateral side of the vehicle, there is an adjacent lane in which an oncoming vehicle travels toward the vehicle;
determine whether the turn direction coincides with the prohibited direction stored within the storage area; and
based on a determination that the turn direction does not coincide with the prohibited direction stored within the storage area, execute a support control for supporting the vehicle turning right or left at the intersection when the support condition is satisfied,
wherein the controller is configured to execute, as the support control, a deceleration control for controlling a power train actuator and a brake actuator to decrease a speed of the vehicle to a predetermined support vehicle speed.

2. The driving support apparatus according to claim 1, wherein the controller is further configured to execute, as the support control, a display control for causing a display device of the vehicle to display a support screen including information on turning left or right.

3. A driving support apparatus comprising:
a camera configured to acquire image data by capturing a scene in front of a vehicle; and
a controller that is configured to:
specify an allowed direction in which the vehicle is allowed to travel on based on a road arrow in the captured scene;
specify a direction that is not the allowed direction as a prohibited direction, based on the road arrow in the captured scene;
store the allowed direction and the prohibited direction to the storage area;
determine that a support condition is satisfied when both a first condition that the controller detects an intersection in front of the vehicle and a second condition that the turn direction in which the vehicle will turn right or left is not the prohibited direction are satisfied;
delete the allowed direction and the prohibited direction from the storage area when the vehicle travels on a lane that is not a one-lane on one side and a travel distance which the vehicle has traveled since the vehicle passes through the road arrow is equal to or longer than a first delete distance;
delete the prohibited direction from the storage area when the vehicle travels on a lane that is the one-lane on one side and the travel distance is equal to or longer than a second delete distance;
delete the allowed direction from the storage area when the vehicle travels on the lane that is the one-lane on one side and the travel distance is equal to or longer than a third delete distance,
wherein the second delete distance is shorter than the first delete distance, and the third delete distance is longer than the second delete distance,
wherein the one-lane on one side is a lane in which, on a lateral side of the vehicle, there is any one of a guardrail, a curb, or a road edge, and on another lateral side of the vehicle, there is an adjacent lane in which an oncoming vehicle travels toward the vehicle; and execute a suppressed support control when the support condition is satisfied and the allowed direction is not stored, wherein the suppressed support control executes a power train actuator and a brake actuator.

\* \* \* \* \*